United States Patent
Hagen (10) Patent No.: US 8,941,910 B2
(45) Date of Patent: Jan. 27, 2015

(54) BEAM FOCUSING DEVICE FOR A LASER WEAPON SYSTEM

(71) Applicant: MBDA Deutschland GmbH, Schrobenhausen (DE)

(72) Inventor: Thomas Hagen, Rohrbach/Ilm (DE)

(73) Assignee: MBDA Deutschland GmbH, Schrobenhausen (DE)

(*) Notice: Subject to any disclaimer, the term of this patent is extended or adjusted under 35 U.S.C. 154(b) by 0 days.

(21) Appl. No.: 13/951,868

(22) Filed: Jul. 26, 2013

(65) Prior Publication Data
US 2014/0218790 A1 Aug. 7, 2014

(30) Foreign Application Priority Data
Jul. 31, 2012 (DE) .......................... 10 2012 015 074

(51) Int. Cl.
*H01S 3/101* (2006.01)

(52) U.S. Cl.
USPC ............................................ 359/333; 372/24

(58) Field of Classification Search
USPC ............................................ 359/333; 372/24
See application file for complete search history.

(56) References Cited

U.S. PATENT DOCUMENTS

| 8,199,405 B2 | 6/2012 | Geidek et al. |
| 2003/0062468 A1* | 4/2003 | Byren et al. ................. 250/216 |
| 2008/0037028 A1* | 2/2008 | Cheung et al. ............... 356/478 |
| 2011/0122895 A1* | 5/2011 | Savage-Leuchs et al. ...... 372/10 |
| 2012/0018614 A1* | 1/2012 | King et al. ................. 250/201.9 |

FOREIGN PATENT DOCUMENTS

| DE | 10 2010 051 097 A1 | 5/2012 |
| DE | 10 2012 000 672 A1 | 4/2013 |
| EP | 2 182 596 A1 | 5/2010 |

* cited by examiner

*Primary Examiner* — Mark Hellner
(74) *Attorney, Agent, or Firm* — Crowell & Moring LLP (57) ABSTRACT

A beam focusing unit for a laser weapon system includes a laser generating unit, an output element unit, and a beam optics element. The beam focusing unit includes a stationary/partly movable part and a fully movable part. The stationary/partly movable part is adapted for positioning or for transporting the beam focusing unit between operations. The fully movable part is adapted for targeting and target-following of the laser weapon system. The beam optics element and the at least one output element unit is arranged on the fully movable part.

18 Claims, 5 Drawing Sheets

BEAM FOCUSING DEVICE FOR A LASER WEAPON SYSTEM

CROSS-REFERENCE TO RELATED APPLICATIONS

The present application claims priority under 35 U.S.C. §119 to German Patent Application No. 10 2012 015 074.1, filed Jul. 31, 2012, the entire disclosure of which is herein expressly incorporated by reference.

BACKGROUND AND SUMMARY OF THE INVENTION

Exemplary embodiments of the present invention relate to laser weapon system. In particular, exemplary embodiments of the present invention relate to a beam focusing unit for a laser weapon system having high movement dynamics and high output power at the same time. Furthermore, exemplary embodiments of the present invention relate to a structure of a beam focusing unit of a laser weapon system on the basis of diode-pumped lasers operated with electrical energy.

Laser weapon systems including laser sources and associated optics that enable to deploy laser weapon systems against different classes of targets are known. Possible deployment scenarios are, for example, self-protection of platforms or offensive deployment. Common to both deployment scenarios is the use of high energy lasers.

Such laser weapon systems can be used against static targets such as, for example, mines, barricades or improvised explosive devices (IED), and also against dynamic targets, specifically as part of the defense against threats by flying objects such as rockets, artillery and mortar (RAM), against guided missiles with and without seeker heads, or against drones or unmanned aerial vehicles (UAV).

For combating such targets, conventional optical radiated power outputs are used that reach well into the range above 100 kW of optical output power.

Naturally, a potential threat normally occurs without advance warning and from an unknown direction, and effective combating the threat requires suitable focusing of a laser weapon system within a few seconds up to fractions of a second.

Operational laser weapon systems therefore require a configuration that enables combating targets and thus enables focusing an active beam, hence the laser radiation emitted by the system, within an entire half-space (i.e., hemisphere) around the laser weapon system. It is important here that focusing and a possible subsequent tracking of a target may require both high spatial movement dynamics as well as precision.

Combating targets in overflight scenarios (the threat flies over the laser weapon system) places special demands on a laser weapon system since in the region of the zenith problems in the form of extremely high focusing speeds and accelerations can occur, which are relevant when tilting over, thus a complete half-space movement, of the beam focusing system is not possible.

A laser weapon system can possibly be implemented using a fiber laser as a laser beam source. Here, transmitting the optical radiated power between laser beam source and beam transmitter is carried out via trailing fiber optics. However, with the optical radiated power outputs and beam qualities that occur, fiber optics are possibly limited in terms of length and also in terms of implementable bending radii since in the case of great lengths, non-linear effects such as, for example, stimulated Raman scattering or thermal effects can occur, which can limit the transmittable power output. Increasing the fiber diameter, in turn, can result in deterioration of the beam quality.

Suitability of a laser source for a laser weapon system is in most cases determined by the mode quality or beam divergence, the spectral properties and the optical power output of the laser source. For implementing a laser weapon system of, for example, 10 kW optical power, the freely available fiber length is normally kept below 2.5 m. However, such a short length normally does not allow implementing a laser weapon system that functions according to the concept of trailing fiber optics and, at the same time, implements movability over large portions of the spatial angle, in particular of a half-space.

A laser weapon system, independent of the type of the embodiment of the actual laser-active medium, for example as a rod, slap, fiber or disc laser, typically comprises a diode-pumped solid state laser. However, a laser weapon system can also be implemented by using liquid, gas or metal vapor lasers, which requires converting the primary energy, e.g., in the form of electrical energy, into radiation energy for optically stimulating the laser-active medium uses a significant number of semiconductor lasers or diode lasers.

In addition to beam generation, a laser weapon system needs a multiplicity of functional elements such as power supply, buffering, cooling, mechanical structure, optical elements, sensors and actuators.

Figure 1:
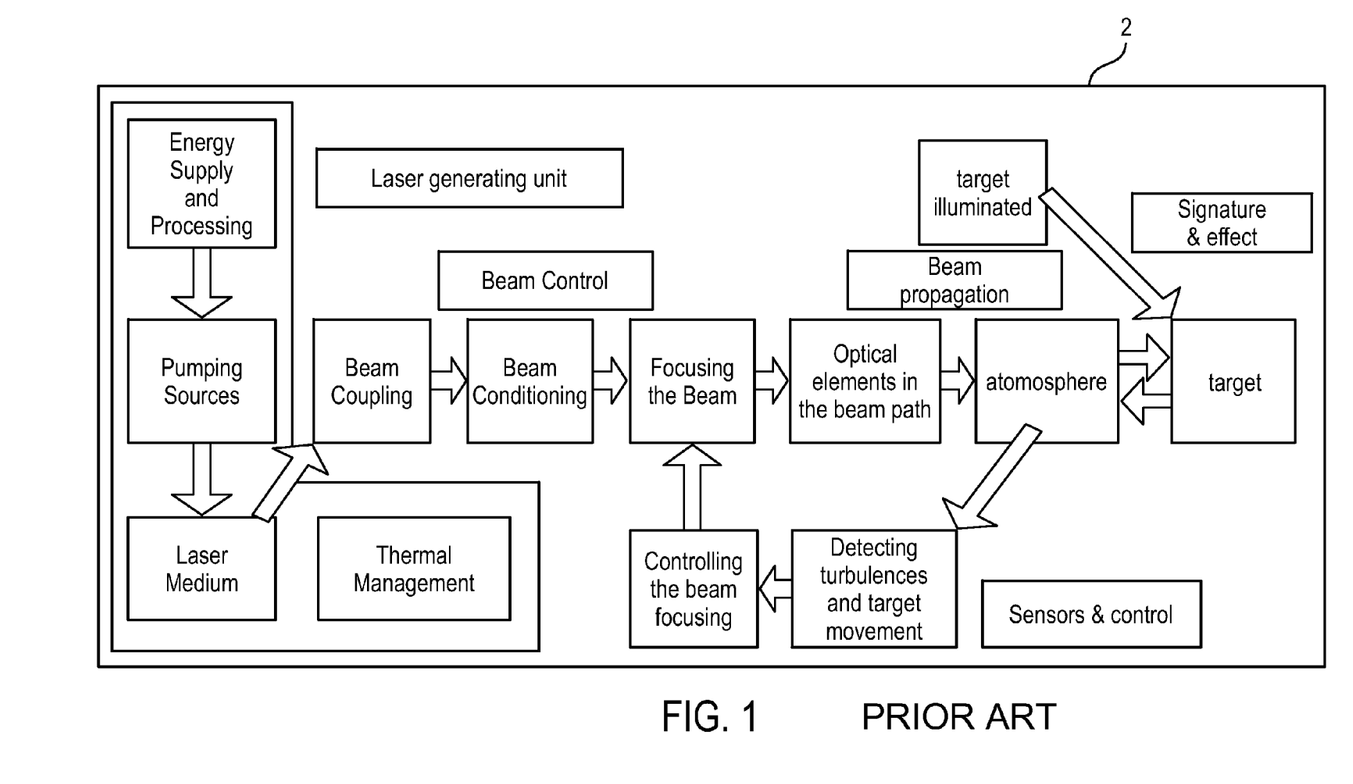
FIG. 1 shows a generic architecture of an active component of a laser weapon system.

A generic architecture of the functional components of a laser weapon system is illustrated in FIG. 1.

Here, an energy supply and processing unit acts on the pumping sources which, by using the laser medium, generates an active beam that is subsequently introduced in the beam control unit. The beam control unit consists of a beam coupling with subsequent beam conditioning, and of elements for enabling focusing the beam, for example, on a target. The active beam subsequently propagates via possible optical elements in the beam path and normally through the earth's atmosphere toward the target, which can be marked by a target illuminator. On the target, the beam induces an effect. Sensors and control electronics can detect, e.g., turbulences of the atmosphere and also target movements, and by using a suitable controller, can reposition or refocus the active beam.

Such a multiplicity of functional elements and auxiliary devices for operating the same add up to a significant weight. For example, a laser weapon system in the power range of 100 kW typically weighs several tons. In this respect, a reduction of the power-to-weight ratio of below 50 kg per kW is unlikely even in the future.

In the case of high-energy laser weapon systems, the obvious possibility of avoiding trailing fiber optics, namely the implementation of a structure with the laser beam source and beam transmitter being rigidly coupled as a whole cannot be employed due to the resulting significant mass to be moved and the focusing dynamics and accuracy that are finally to be implemented because of this.

A possible alternative implementation of a laser weapon system is based on the concept of separating the laser weapon system into a static part (beam generation including auxiliary aggregates and platform), and a movable part (in particular the beam transmitter) that follows the target. In the static part, preferably, all elements comprising a mass or a volume are to be arranged so as to keep the movable part, which has to follow the target, as light and agile as possible.

Figure 2:
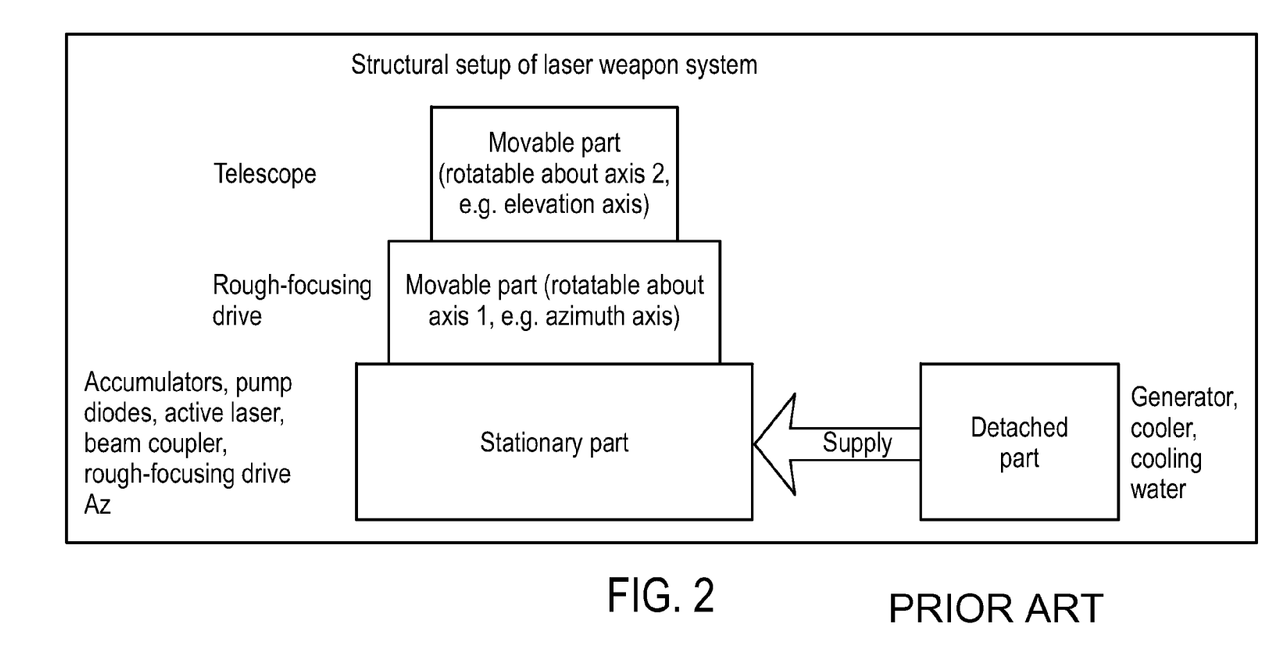
FIG. 2 shows an allocation of functional components of a laser weapon system.

FIG. 2 shows such a division of the functional components into a detached part, a stationary part, and two drive parts that are substantially separated from each other. The detached part can consist of a generator for generating the required energy, and of the functional elements thereof such as cooler and cooling water supply. The generated energy is fed via a supply unit to the stationary part in which the laser generating unit is arranged. Subsequently, the generated active beam is focused in a two-part movable part on a target, for example. The movable part can be divided into a rough drive which, in first instance, can be rotated about an axis, for example the azimuth axis, and into a second part having a second axis, for example the elevation axis.

However, in a system according to FIG. 2 the active beam generated by the laser beam source(s) may have to be guided to the beam transmitter, which can be configured as a telescope, by two axes that are movable within a wide angular range. A possible way of decoupling rotational movements between different parts of a beam focusing system that move relative to one another, and of transmitting the optical radiated power from one part to the next one would principally be monolithic rotary transmitters/couplings for fiber optics. However, they cannot be implemented in the radiated power and beam quality categories that are of interest for a laser weapon system. This particularly applies if, to increase the power output through beam coupling, a plurality of independent beams are to be transmitted to a beam coupling unit flanged onto the beam transmitter.

A possible implementation of a suitable transmission is a free-beam transmission between laser beam source and beam transmitter, which are normally implemented such that movement axes or rotational axes of a beam focusing system coincide at least in sections with the longitudinal extension direction of a partial free-beam transmission. For this, known astronomical telescopes are available, wherein the beam guidance is implemented in the reverse direction (i.e., from the outside through the telescope to a sensor or measuring instrument). Such a principle is known as coudé focus or (for an axis) as Nasmyth focus.

However, since in astronomical telescopes the boundary conditions of transmittable light outputs (in the nanowatt range) in comparison to several 100 kW for laser weapon systems, and also the required focusing speed and necessary kinematic dynamics are significantly different, which, at the same time, entails a considerable impact on the design of the optical elements, on the mechanical construction and on the necessary focusing drive including sensors and control, astronomical telescopes do not represent a suitable platform for the development of a laser weapon system.

Exemplary embodiments of the present invention relate to a laser weapon system having a novel connection of laser generating element and beam optics element in such a manner that high spatial dynamics and precision of focusing of an active beam can be implemented without having to accept a deterioration of the properties of the active beam during the transmission to the beam optics element.

In particular, focusing speeds of $>=1$ rad/s, focusing accelerations of $>=1$ rad/s$^2$ and a focusing accuracy of $>=5$ μrad are implementable within the scope of the present invention.

In accordance with exemplary embodiments of the present invention the beam transmission is configured to a beam focusing system of a laser weapon system in such a manner that an output element unit situated at the end of the amplification chain of a laser source and finally determines the mode quality or beam divergence, spectral properties and, in particular, the optical power of the radiation emitted by the laser source, is separated or detached from the remaining laser generating components and is arranged on the fully movable part of the focusing system, which movable part belongs to the focusing unit or beam optics element of the laser weapon system.

Here, the structure is configured such that a system is created in which the active beam finally focused on a target can be focused in the full half-space surrounding the laser weapon system, wherein the power transmission between the elements, in which the energy conversion from an energy form into optical radiation energy takes place, and the final optomechanical element responsible for focusing the beam on the target is carried out in such a manner that the power transmission to an output element unit is carried out via a fiber-optic connection or fiber-optic elements and is arranged on that part of the laser weapon system that is set up for targeting and/or target-following. Here, transmitting the optical energy is in particular carried out via at least one movable axis and not via free-beam guidance.

In accordance with exemplary embodiments of the present invention the beam source is functionally divided in such a manner that, in consideration of volume and mass, separation of the components of the beam sources is carried such that they are separated into such components which, on the one hand, decisively determine the mode quality or beam divergence and the spectral properties and, on the other, the optical power.

In particular, an output element unit that decisively determines the output beam quality but is responsible only for a fraction of the total volume and the total mass of a radiation source is directly coupled to the movable part of the beam focusing unit and moves with the same during each focusing process, while the output element unit is supplied via fiber-optic elements with optical radiated power which is generated in the pumping sources which, together with the associated auxiliary aggregates such as energy supply, cooler etc., are decisive for the majority of the total volume and the total mass of a beam source, wherein the pumping sources are arranged in a stationary or at most partly movable part of the system. Transmitting the power and the optical signals between the two parts of the stationary/partly movable part and the fully movable part takes place via fiber-optic elements which, however, do not need to have the same optical quality or power capacity as, for example, the connection of output element unit and beam optics element.

This arrangement achieves the advantages of a fiber-optic power transmission over a free-beam transmission such as, for example, robustness, independence from adjustments, insensitivity to harmful environmental influences, flexible geometrical configuration and low volume and mass can be maintained without significantly limiting the available focusing region (hemisphere), without unnecessarily increasing the total volumes and masses to be moved on a movable part of a beam focusing system beyond the necessary level, and without the need of significantly cutting back in terms of mode quality or beam divergence, spectral properties and optical power, and therefore (spectral) irradiance available on a target. The operational reliability is also increased at the same time.

It should be understood that the fully movable part of the laser weapon system is the part that is set up in a freely movable manner in the half-space for targeting and/or target-following. A partly movable part or stationary part can be arranged, for example, on a transport platform so as to keep the entire laser weapon system transportable between different operational areas or operational sites, without this movement influencing the actual operation of the laser weapon system in terms of targeting and target-following.

An output element unit according to the invention can be configured as a fiber laser, wherein the output element unit can be implemented with a fiber output again, but with a significantly shorter length than would be needed if the output element unit would not be arranged on the fully movable part, a so-called fully movable fiber length, or can already be implemented as a free beam. In both cases, the fiber-guided path of the signal transmission ends only in the fully movable part of the focusing unit belonging to the laser weapon system. A fiber-based connection to the output element unit is therefore still necessary; however, since the functional configuration of the output is set up on the fully movable part of the laser weapon system, this fiber transmission can be configured differently, it is in particular not necessary to transmit the traditionally needed high power outputs and/or high beam quality without losses.

Also, the output element unit can be configured as an optically pumped laser source, wherein the medium is configured as a rod, slap or disc laser, or is configured as a number or combination of such geometries. The connection of the output element unit to a beam focusing unit can be configured as an optical fiber or as a free beam. An output element unit according to the invention does not necessarily have to provide an increase of the optical output power of a laser source, thus a power amplification of considerably greater than 1. Rather, an output element unit according to the invention can be configured in a largely passive manner, thus non-amplifying, and can in particular compensate deteriorations of beam properties with regard to mode quality or beam divergence, or spectral or time-depenent properties of the beam, which deteriorations occur during the transmission of upstream output units, and/or can improve the output beam.

Here, the concept according to the invention is not limited to the use of a single beam source; rather, it can also be applied to the principle of beam coupling a plurality of laser sources. In such a case, a plurality of output element units of the respective individual laser beam sources can be used, which output element units connect in an equivalent manner to a subsequent beam coupler that is also located on the fully movable part of the beam focusing system.

According to the invention, this results therefore in a laser weapon system that can be focused in the full half-space, and which avoids the properties of the active beam being negatively influenced through a fiber length necessary for beam transmission of the output power of the laser system by using trailing fiber optics. Also, avoided is the use of a free beam of high power via rotational axes, the guidance of which free beam puts high accuracy demands on the components used and on the one or a plurality of axes that are moved relative to one another and to a stationary reference system, and it is avoided at the same time that the laser sources of the laser system required for generating the laser beam, or at least particularly voluminous or high-mass parts thereof such as pumping sources, energy supply, storage and cooling system do not have to be moved together with the fully movable part of the beam focusing unit during a focusing process.

Furthermore, the solution according to the invention results in increased reliability and operational readiness of an overall laser weapon system since, due to the structure according to the invention, the number of elements involved in the beam guidance is significantly reduced and can be limited substantially to monolithic fiber elements, in particular in the movable part. Also, for example in the case of beam coupling, it arises that a failure of an individual string can no longer have a catastrophic effect on the function of the overall system.

Further exemplary embodiments and advantages of the present invention arise from the following description of the figures. In different figures, identical or similar elements are designated by identical or similar reference numbers.

The illustration in the figures is schematic and not to scale; however, it may represent qualitative proportions.

DETAILED DESCRIPTION

Figure 3:
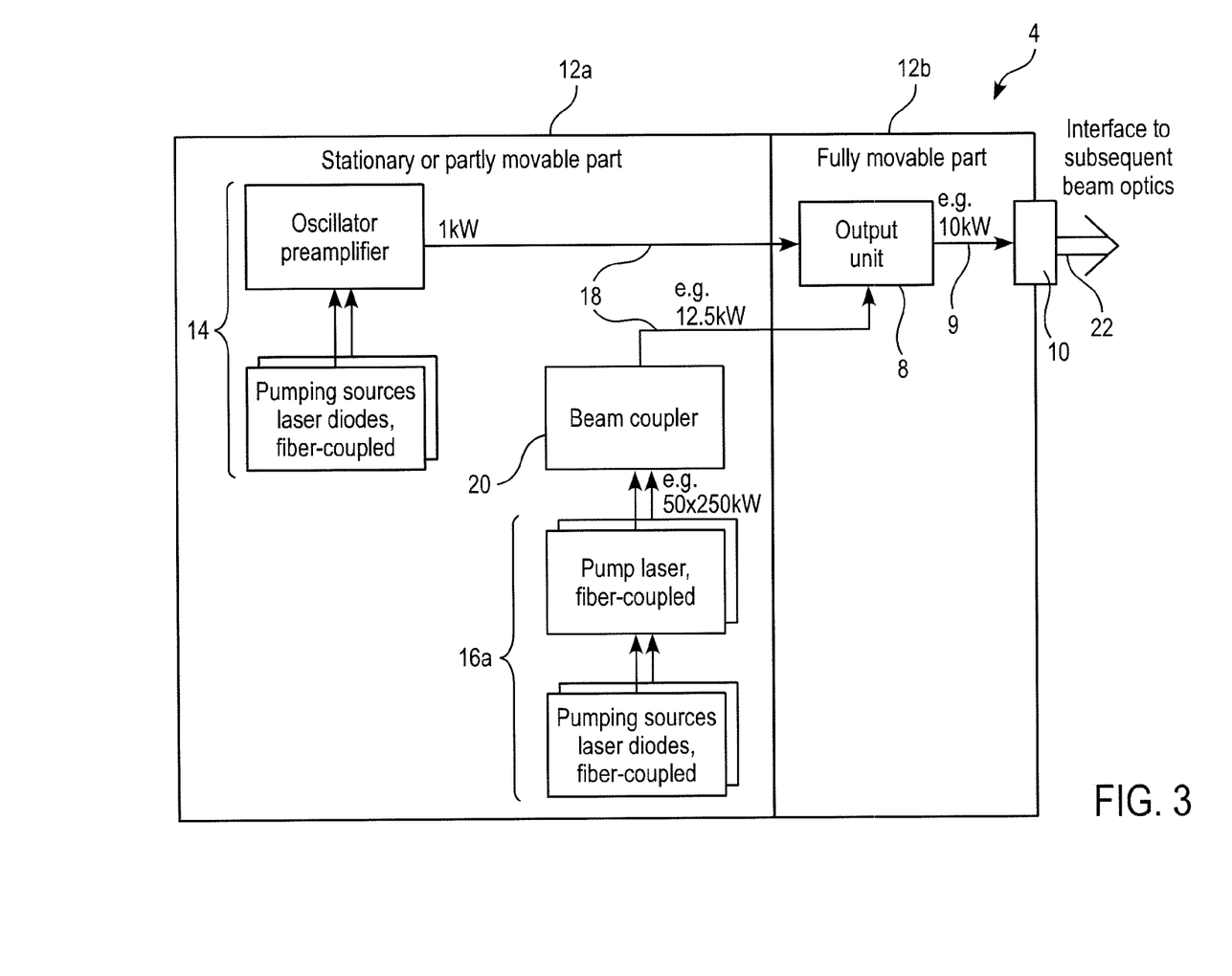
FIG. 3 shows an exemplary configuration of a laser weapon system according to the present invention.

FIG. 3 shows an exemplary structural setup of a laser weapon system with a detached output element unit 8.

The beam focusing unit 4 of the laser weapon system comprises a stationary or partly movable part 12a and a substantially fully movable part 12b. The fully movable part 12b is adapted here for targeting and/or target-following of the active beam and, according to the invention, can substantially extend over a half-space, thus a hemisphere seated on the earth's surface at the site of the laser weapon system.

The laser generation of the laser weapon system 2 according to FIG. 3 is based here on a fiber laser. The latter has a first laser generating part or a seed laser unit 14 connected to the output element unit 8 via a fiber conductor 18. Furthermore, the fiber laser has a pump laser unit 16a composed of a plurality of individual fiber-coupled pump lasers that are supplied from pumping source laser diodes. Each of the individual pump lasers illustrated in FIG. 3 have a laser power of 250 W and are shown in a quantity of 50 pieces as an example. These individual laser power outputs are combined in a beam coupler 20 and are also fed via an optical fiber 18 to the output element unit 8. Here, the seed laser unit 14 has an exemplary power output of 1 kW while the pump laser units 16a as a whole have a power output of 12.5 kW.

Furthermore, a fiber amplifier unit 16b can also be provided which, however, is not explicitly illustrated in FIG. 3. The latter, for example, can also be arranged in the output element unit 8 and can be supplied from both optical fiber elements 18. The output element unit 8 in FIG. 3 has an exemplary output power of 10 kW and thus may not be considered as an amplifier element in the traditional sense. For example, the output element unit 8 in FIG. 3 enables an improvement of the output beam and therefore, for example, a compensation or improvement of the mode quality, the spectral divergence or spectral and/or time-dependent properties of the output beam. The output beam coming from the output element unit 8 is transferred via an optical fiber 9 or an optical free beam 9 to the beam optics element 10, which subsequently is responsible for emitting the active beam 22.

Hereby, essential for the invention is the arrangement or the connection of the seed laser unit 14 and the pump laser units 16a to the output element unit 8, wherein the optical fibers 18 are used between the stationary/partially movable part and the fully movable part of the laser weapon system 2.

Figure 4:
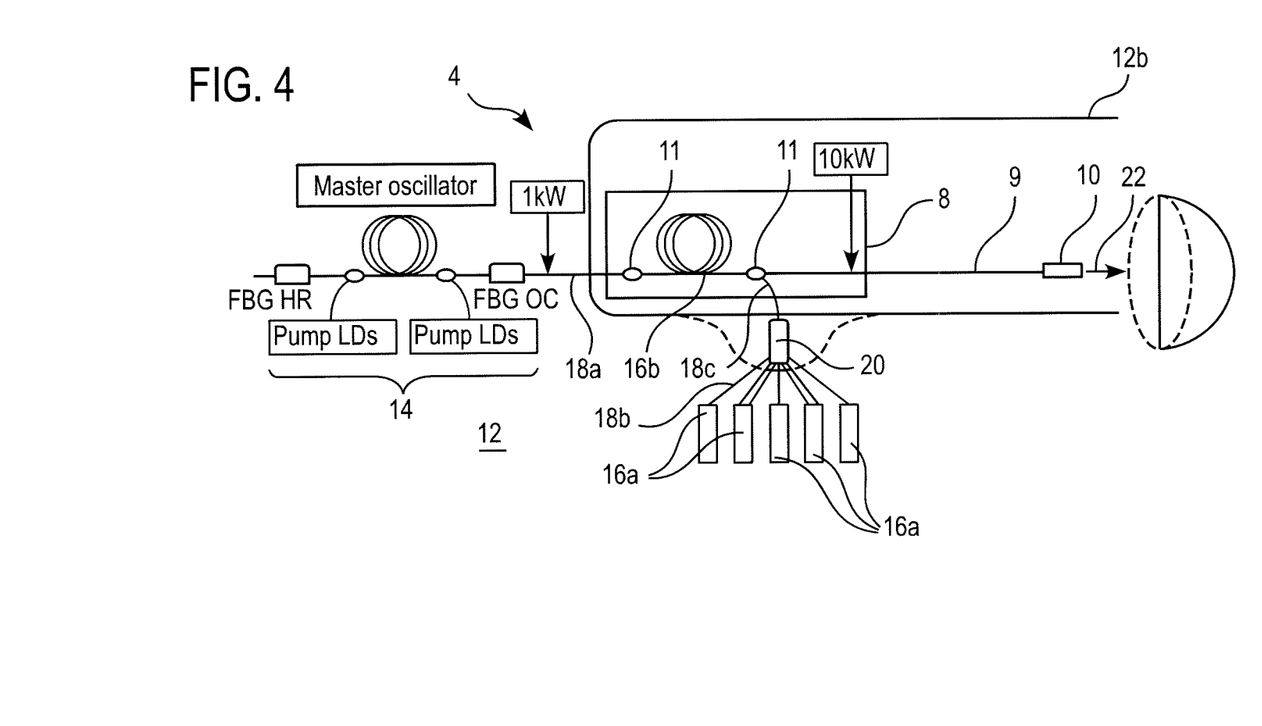
FIG. 4 shows an exemplary configuration of a fiber laser according to the present invention.

Now referring to FIG. 4, an exemplary configuration of a fiber laser according to the present invention is illustrated.

FIG. 4 shows the schematic structure of the active beam generation of a beam focusing unit 4 according to the invention. A seed laser unit 14 in FIG. 4, which is substantially known from the prior art, comprises, as an example, two pump laser diodes and generates with the active fiber or the master oscillator a laser beam having the input power for the downstream fiber amplifier or an optically pumped fiber 16b. Upstream and downstream of the active fiber of the seed laser unit 14, fiber Bragg gratings are arranged as wavelength-selective fiber reflector of the fiber-coupled pump laser diodes.

The seed laser unit 14 has a power of, for example, 1 kW and, by using an optical fiber 18a, is coupled to the output element unit 8. By using optical fibers 18b, pump laser units 16a are connected to a beam coupler unit 20 which, in turn, is connected to the output element unit 8 via the optical fiber 18c. Here, the beam coupler unit 20 can be part of the output element unit 8 or, alternatively, can at least be arranged on the fully movable part 12b. Thus, the optical fibers 18a,b or 18a,c can provide the transition between the stationary/partly movable part 12a and the fully movable part 12b.

FIG. 4 shows different coupling points 11 of the pump laser units 16a and/or the beam coupler unit 20 into the output element unit 8, in particular upstream and downstream of the fiber amplifier unit 16b.

The active beam in the optical fiber 18 within the output element unit 8 is transferred using an optical fiber 9 or an optical free beam 9 to a beam optics element 10, which may emit the active beam 22 in a focused or targeted manner, in particular in a half-space, depending on the configuration of the fully movable part of the beam focusing unit 4. The active beam 22 thus can be focused on a target and can achieve there a required or desired effect.

Figure 5:
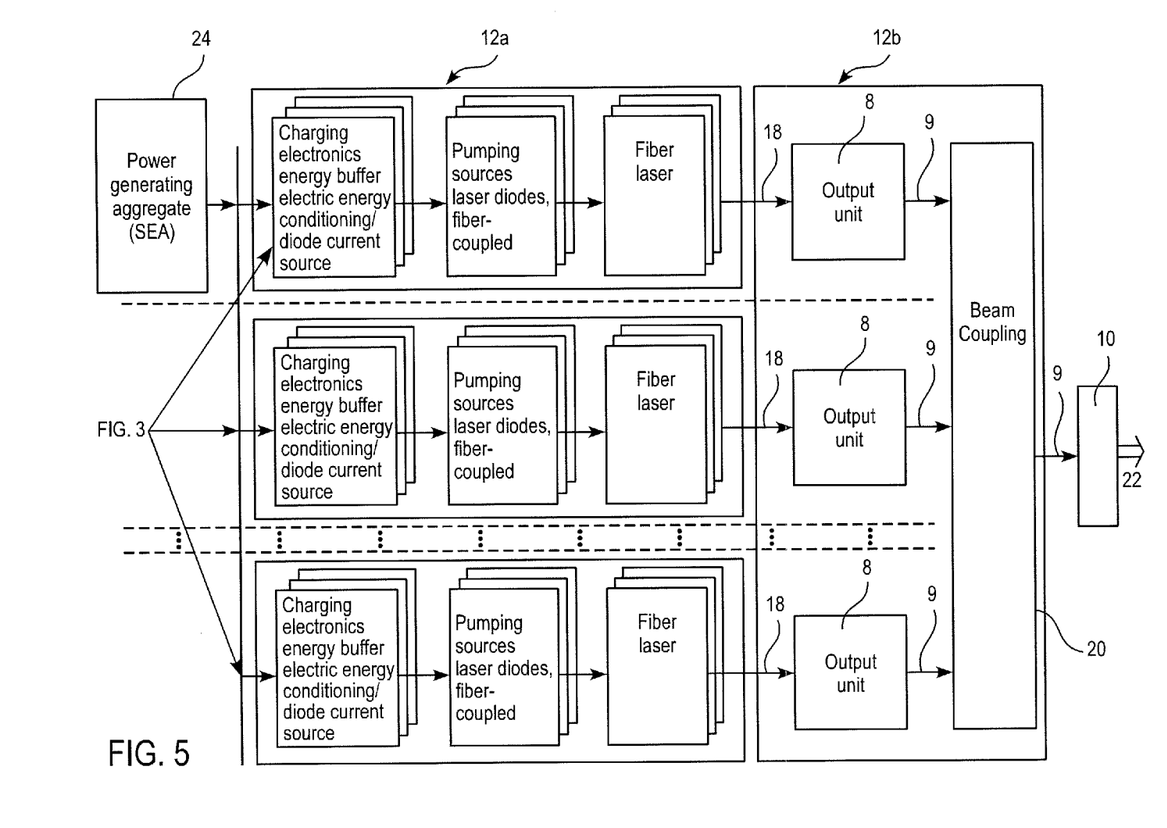
FIG. 5 shows a further exemplary configuration of a laser weapon system according to the present invention.

Now referring to FIG. 5, a further exemplary configuration of a laser weapon system according to the present invention is illustrated.

FIG. 5 consists here substantially of a plurality of exemplary configurations of a laser weapon system according to FIG. 3. They are connected to a common power supply 24, but otherwise represent independent units. The individual laser generating units are again connected to individual output element units 8 by using optical fibers 18. This entirety of output element units 8 is arranged here on the fully movable part 12b. Each of the output element units 8 is connected to a (further) beam coupling unit 20 by using an optical fiber 9 or an optical free beam 9. In the beam coupling unit 20, the individual beam portions of the individual output element units 8 are now combined and are transferred via an optical fiber 9 or a further optical free beam 9 to the beam optics element 10 for emitting the active beam 22. A configuration of FIG. 5 represents here in particular a scalable system since a desired or required output power can be implemented by correspondingly adapting the number of the individual modules according to FIG. 3.

It should be noted that "having" or "comprising" does not exclude other elements or steps and that "a" or "one" does not exclude a multiplicity. Furthermore, it should be noted that features or steps that have been described with reference to one of the above exemplary embodiments can also be used in combination with other features or steps of other above-described exemplary embodiments. Reference numbers in the claims are not to be regarded as limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST

2 Laser weapon system
4 Beam focusing unit
6 Laser generating unit
8 Output element unit
9 Optical fiber/optical free beam
10 Beam optics element
12a Stationary/partly movable part
12b Fully movable part
14 Seed laser unit
16a Pump laser unit
16b Fiber amplifier unit
18a,b,c Optical fiber
20 Beam coupler unit
22 Active beam
24 Energy supply

What is claimed is:

1. A beam focusing unit for a laser weapon system, comprising:
    a laser generating unit;
    at least one output element unit; and
    a beam optics element;
    wherein the beam focusing unit comprises a fully movable part and a stationary or partly movable part;
    wherein the stationary or partly movable part is configured to position the beam focusing unit or to transport the beam focusing unit between operations;
    wherein the fully movable part is configured to target or follow targets for the laser weapon system;
    wherein the beam optics element and the at least one output element are arranged on the fully movable part.

2. The beam focusing unit according to claim 1, wherein the at least one output element unit is configured to provide at least one function from the group consisting of amplifying optical output power, improving an output beam, compensation or improvement of mode quality, beam divergence, spectral properties of the output beam or time-dependent properties of the output beam.

3. The beam focusing unit according to claim 1, wherein the laser generating unit is a fiber laser.

4. The beam focusing unit according to claim 1, wherein the laser generating unit comprises:
    at least one seed laser unit;
    at least one pump laser unit; and
    at least one fiber amplifier unit;
    wherein the laser generating unit is connected to the output element unit by an optical fiber.

5. The beam focusing unit according to claim 1, wherein the at least one output element unit comprises:
    a fiber amplifier unit, wherein a seed laser unit and at least one pump laser unit are connected to the at least one output element unit by at least one optical fiber.

6. The beam focusing unit according to claim 1, comprising:
    a plurality of pump laser units, wherein the plurality of pump laser units is connected to a beam coupler unit, and wherein the beam coupler unit is connected to the at least one output element unit.

7. The beam focusing unit according to claim 1, comprising:
    a plurality of pump laser units, wherein the plurality of pump laser units is connected to the at least one output element unit, and wherein the at least one output element unit comprises a beam coupler unit.

8. The beam focusing unit according to claim 1, wherein
the beam focusing unit is configured to focus an active
   beam substantially within a half-space; or
dynamic properties of the fully movable part for targeting
   and target-following of the beam optics element of the
   laser weapon system comprise
   a focusing speed>0.1 rad/s;
   a focusing acceleration>0.1 rad/s$^2$; or
   a focusing accuracy<20 μrad.

9. The beam focusing unit according to claim 1, wherein
the beam focusing unit is configured to focus an active
   beam substantially within a half-space; or
dynamic properties of the fully movable part for targeting
   and target-following of the beam optics element of the
   laser weapon system comprise
   a focusing speed>0.5 rad/s;
   a focusing acceleration>0.5 rad/s$^2$; or
   a focusing accuracy<15 μrad.

10. The beam focusing unit according to claim 1, wherein
the beam focusing unit is configured to focus an active
   beam substantially within a half-space; or
dynamic properties of the fully movable part for targeting
   and target-following of the beam optics element of the
   laser weapon system comprise
   a focusing speed>1 rad/s;
   a focusing acceleration>1.5 rad/s$^2$; or
   a focusing accuracy<10 rad.

11. The beam focusing unit according to claim 1, wherein
the beam focusing unit is configured to focus an active
   beam substantially within a half-space; or
dynamic properties of the fully movable part for targeting
   and target-following of the beam optics element of the
   laser weapon system comprise
   a focusing speed>1.5 rad/s;
   a focusing acceleration>2 rad/s$^2$; or
   a focusing accuracy<5 rad.

12. The beam focusing unit according to claim 1, wherein
the beam focusing unit is configured to focus an active
   beam substantially within a half-space; or
dynamic properties of the fully movable part for targeting
   and target-following of the beam optics element of the
   laser weapon system comprise
   a focusing speed>2 rad/s;
   a focusing acceleration>2 rad/s$^2$; or
   a focusing accuracy<2 μrad.

13. The beam focusing unit according to claim 1, wherein
an optical fiber or an optical free beam couples the at least one
output element unit and the beam optics element, wherein a
length of the optical fiber or the optical free beam is <2.5 m.

14. The beam focusing unit according to claim 1, wherein
an optical fiber or an optical free beam couples the at least one
output element unit and the beam optics element, wherein a
length of the optical fiber or the optical free beam is <2 m.

15. The beam focusing unit according to claim 1, wherein
an optical fiber or an optical free beam couples the at least one
output element unit and the beam optics element, wherein a
length of the optical fiber or the optical free beam is <1.5 m.

16. The beam focusing unit according to claim 1, wherein
an optical fiber or an optical free beam couples the at least one
output element unit and the beam optics element, wherein a
length of the optical fiber or the optical free beam is <1 m.

17. The beam focusing unit according to claim 1, wherein
an optical fiber or an optical free beam couples the at least one
output element unit and the beam optics element, wherein a
length of the optical fiber or the optical free beam is <0.5 m.

18. A laser weapon system, comprising:
   a beam focusing unit, which comprises
      a laser generating unit;
      at least one output element unit; and
      a beam optics element;
      wherein the beam focusing unit comprises a fully movable part and a stationary or partly movable part;
      wherein the stationary or partly movable part is configured to position the beam focusing unit or to transport the beam focusing unit between operations;
      wherein the fully movable part is configured to target or follow targets for the laser weapon system;
      wherein the beam optics element and the at least one output element are arranged on the fully movable part.

* * * * *